United States Patent [19]

Felt

[11] Patent Number: 5,423,393
[45] Date of Patent: Jun. 13, 1995

[54] AUXILIARY ENGINE ASSEMBLY FOR A BICYCLE

[76] Inventor: Robert M. Felt, 2800 Virginia, Billings, Mont. 59102

[21] Appl. No.: 151,164

[22] Filed: Nov. 12, 1993

[51] Int. Cl.⁶ .............................................. B62M 7/08
[52] U.S. Cl. ................................... 180/22; 180/65.2
[58] Field of Search ............... 180/221, 205, 206, 207, 180/65.2, 222

[56] References Cited

U.S. PATENT DOCUMENTS

| | | | |
|---|---|---|---|
| 1,158,311 | 10/1915 | Schunk | 180/205 |
| 2,491,076 | 12/1949 | Benazzoli | 180/205 |
| 2,586,082 | 2/1952 | Piatti | 180/205 |
| 3,339,659 | 9/1967 | Wolf | 180/205 |
| 3,905,442 | 9/1975 | O'Neill | 180/221 |
| 3,961,678 | 6/1976 | Hirano et al. | 180/221 |
| 3,966,007 | 6/1976 | Havener | 180/205 |
| 4,200,164 | 4/1980 | Pearne | 180/206 |
| 5,024,286 | 6/1981 | Lean et al. | 180/206 |
| 5,078,227 | 1/1992 | Becker | 180/221 |

*Primary Examiner*—Anna Marie Boehler

[57] ABSTRACT

A gas-powered engine assembly is mounted on a carriage supported over the rear tire of a conventional bicycle. The assembly includes a small internal combustion engine supported on the carriage and a driven polyurethane friction wheel for propelling the rear bicycle tire. The assembly includes a compression spring within the carriage tending to move the carriage and engine drive wheel out of engagement with the bicycle rear tire, and a cable and clutch arrangement for lowering the drive wheel into engagement with the bicycle rear tire. A horizontally moveable strut associated with the carriage is selectively manipulated by a manually operated clutch control, whereby the engine drive wheel is moved from an operative to a non-operative position. The output engine drive arrangement includes a multiple tooth cog located within a pocket formed in the drive wheel, for providing a flexible drive mechanism for accommodating possible defects such as a slightly out of round and/or unbalanced tire and the like. The polyurethane drive wheel is adjustably mounted over the tire to accommodate irregularities in the driven bicycle tire, and thus assure constant engagement with the bicycle tire. Brake and operator associated momentary switches for the engine are provided for safety.

18 Claims, 6 Drawing Sheets

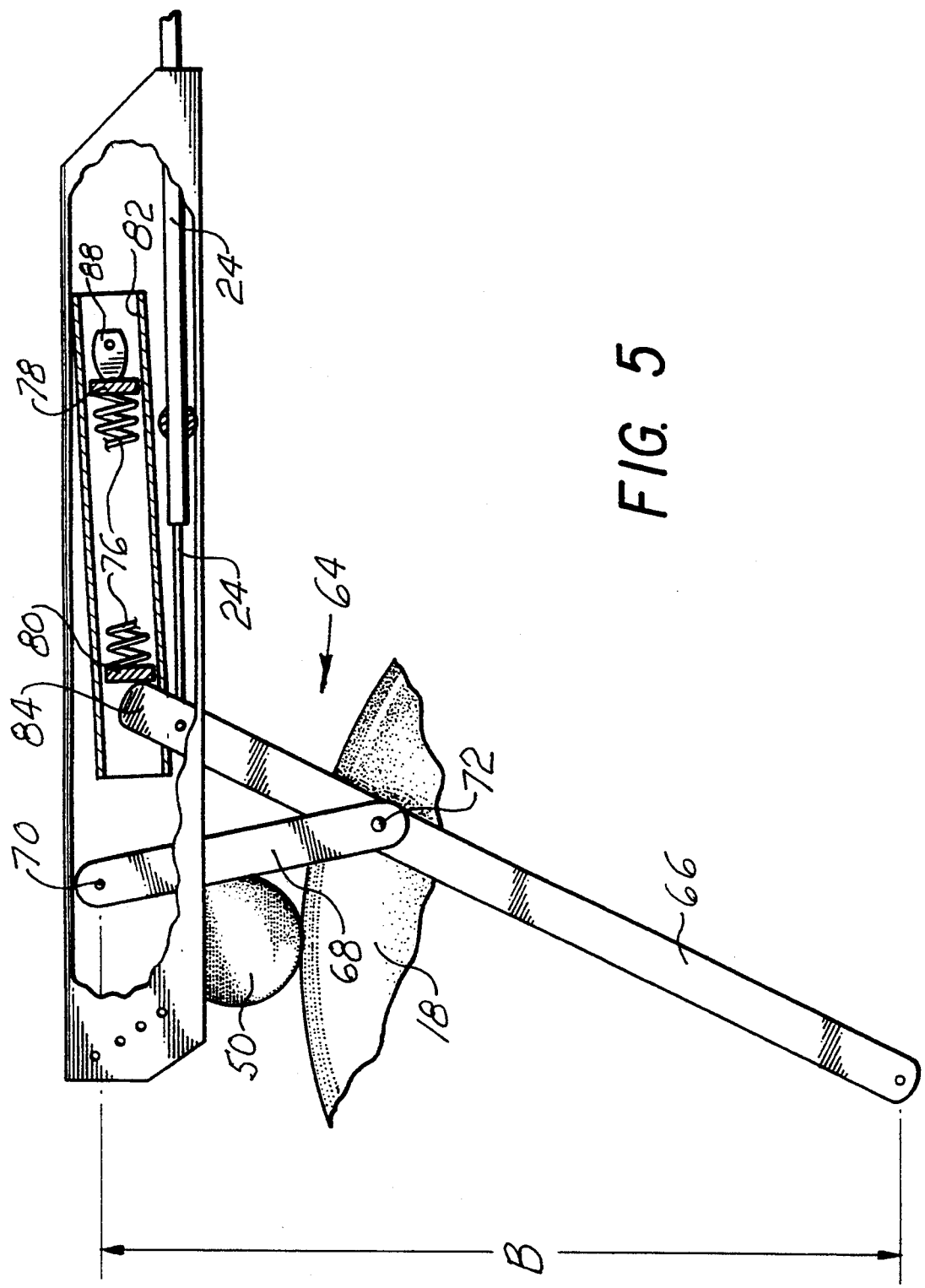

AUXILIARY ENGINE ASSEMBLY FOR A BICYCLE

BACKGROUND OF THE INVENTION

1. Field of the Invention

The present invention relates to a gas-powered auxiliary engine and universal mount assembly for a multi-wheeled vehicle, e.g., a bicycle. More particularly, the invention relates to an engine assembly which selectively, drivingly engages the rear wheel of a bicycle, is readily attached to and detached from almost any size and/or style of bicycle, and includes uncomplicated safety features.

2. Description of the Prior Art

The present invention provides an extremely light weight and uncomplicated auxiliary engine and universal mounting assembly therefor, so that the engine may be readily attached to most any type of bicycle or other multiwheel manually powered vehicle, with minimum difficulty. Furthermore, the instant invention provides: brake actuated kill switches for the engine, an important safety feature; a mounting assembly which spring urges the engine into a non-driving, fail safe configuration, another important safety feature; and a cable operated clutch arrangement which provides engagement of the engine drive wheel with the rear tire of the bicycle, unlike prior art auxiliary engine assemblies. A further safety feature may be a key operated engine kill switch associated with the bicycle seat, for example. The Dead Man switch assures that the engine is disabled automatically should the rider become separated from the bicycle. Additionally, the present invention provides a unique drive wheel made of polyurethane material or the like, the drive wheel providing a vibration reducing, cushioned mount for the engine when the drive wheel is engaged with the bicycle driven wheel, the assembly also serving as a vibration dampener to greatly reduce the effects of vibration not only from the engine but also from the terrain over which the bicycle is ridden; furthermore, the assembly has been found quite effective in maintaining a secure engagement of drive wheel and driven wheel even when the terrain over which the bicycle is ridden is very rough, or even of washboard configuration.

It is well known in the prior art to equip an existing pedal powered bicycle with an auxiliary engine. However, a number of distinct disadvantages are encountered with prior art motorized bicycles. Some examples are: mounting of the engine requires substantial modification to the conventional bicycle; the installation of prior art auxiliary engines is time-consuming and expensive for the average novice mechanic; and such assemblies often require an engine of special design, an unnecessary additional expense.

The prior art of motorized bicycles discloses the practice of having a drive arrangement that includes a motor driven friction pulley, such as a friction wheel, or the like, which drive arrangement contacts the surface of a rear tire of a bicycle. Further, such prior art discloses the practice of a spring biasing the auxiliary engine so as to maintain driving contact between the friction device and the bicycle tire. Further, prior art motorized bicycle assemblies generate considerable difficulties in their installation onto existing bicycles, especially in view of their complicated driving arrangements. These installations necessitate extensive modification to the bicycles onto which they are to be mounted.

Examples of prior art auxiliary engine assemblies for conventional, pedal driven bicycles will now be discussed in some detail.

U.S. Pat. No. 1,158,311, issued Oct. 26, 1915 to George S. Schunk, shows an auxiliary engine for bicycles, pivotally mounted behind the bicycle seat, but requiring a spring arrangement to force the engine drive wheel onto the rear tire of the bicycle. No provision whatsoever is made to readily and easily remove the engine drive wheel from the bicycle rear tire.

U.S. Pat. No. 2,491,076, issued Dec. 13, 1949 to Mario Benazzoli, discloses an auxiliary engine for a bicycle including an engine spring slung mounted beneath the pedal cranks and no provision is made for displacing the drive roller or wheel of the engine from the bicycle rear tire.

Schunk and Benazzoli exemplify prior art attempts which fail to keep an auxiliary engine drive wheel off of the rear tire.

U.S. Pat. No. 2,586,082, issued Feb. 19, 1952 to Sanzio P. V. Piatti, discloses an auxiliary engine with a drive wheel, spring urged into engagement with a bicycle wheel, rather than away from the bicycle wheel. A cable and hand control are employed to move the engine and roller away from the driven bicycle wheel, not toward it as in the instant invention. Thus, there is no shock absorbing action for the engine when disengaged, since there is no spring support for the engine in this attitude, again unlike the present invention. Furthermore, should the cable support system of Piatti fail, then the engine and drive wheel will fall onto the bicycle wheel, thus creating a potentially very unsafe situation. Additionally, Piatti addresses the problem of heat transfer and admits the problem of the tire becoming overheated. However, the solution taught in Piatti is to provide an engine drive wheel with an internal cooling fan, which is completely inapposite to the instant invention, where an engine carriage also functioning as a heat sink reduces heat transfer to the drive wheel to an acceptable minimum.

U.S. Pat. No. 3,339,659, issued Sep. 5, 1967 to Walter A. Wolf, discloses two auxiliary engine powered cones which are frictionally engaged with a bicycle tire 80, by reason of both the weight of the power unit plus the forces exerted by a pair of tension springs, urging the cones into firm engagement with the bicycle rear tire 122. As pointed out in this patent (column 1, lines 16 to 29) considerable difficulty has been encountered in the prior art in maintaining a uniform and efficient driving engagement of the auxiliary engine drive wheel to the bicycle tire; the problem is solved by use of the present invention, without need of complex drive wheels and spring assemblies, as will be detailed below.

U.S. Pat. No. 3,966,007, issued Jun. 29, 1976 to Ralph L. Havener, et al., discloses an auxiliary electric motor for a bicycle with a battery and battery casing disposed between the rider's legs. Both weight and location of components proposed by Havener, et al., generate obvious problems.

U.S. Pat. No. 4,200,164, issued Apr. 29, 1980 to Frank S. Pearne, represents an improvement over the art as just discussed, disclosing an auxiliary engine for a bicycle which is readily mounted onto and detached from the bicycle. However, the Pearne arrangement requires an extra handle for operating the engine and, similarly to the art set forth above, requires a tension spring arrangement to urge the engine drive wheel onto the bicycle rear tire, in direct contradistinction to the present invention, which utilizes spring force to urge the drive wheel away from the tire. Again, and as is the case with other prior art discussed above, the proposed arrangement likely will not keep the drive wheel in engagement when the bicycle is ridden over rough terrain of any kind, and Pearne completely fails to address the matter of heat transfer problems.

In summary, the art exemplifies prior attempts to provide an adequate auxiliary engine for a bicycle, all of which fail to force an auxiliary engine drive wheel off of the rear tire, rather than onto it, and provide selective engagement of the engine drive wheel with a bicycle tire, without need of utilizing anything other than a cable tension assembly and the force of gravity.

None of the above inventions and patents, taken either singly or in combination, is seen to describe the instant invention as claimed.

SUMMARY OF THE INVENTION

The present invention relates to an auxiliary, gas-powered engine assembly for use on a bicycle. The assembly has a small internal combustion engine mounted on a carriage assembly which is supported from one side of the rear axle of the bicycle, and a driven polyurethane friction wheel for propelling the rear bicycle tire. The assembly includes a compression spring mechanism within the carriage which is arranged, dimensioned and configured to force the engine drive wheel off of the bicycle rear tire, rather than onto it. A two legged (one short, one long), horizontally moved, adjustable strut associated with the carriage is selectively manipulated by a manually operated clutch control, against the force of the spring, whereby the drive wheel is moved from a non-operative, fail safe attitude under urging of the compression device mechanism, to an operative position, against the urging of the spring, with a polyurethane or like material drive wheel in engagement with the bicycle rear tire. The output engine drive arrangement includes a multiple tooth cog or sprocket, interfit within the drive wheel; it has been found that a non-rigid fit provides a self adjusting, flexible drive mechanism for overcoming imperfectly formed tires, wheels or both. This improves efficiency and reduces wear and tear on the entire drive train. It is believed that these real and annoying imperfections, resulting from the ordinary course of manufacture, generate the drive wheel to bicycle tire engagement problems which were attempted to be addressed by prior art proposals.

Additionally, the present invention provides auxiliary engine controls (clutch and throttle) which are bicycle handle mounted for ready access, and a pair of momentary engine kill switch arrangements which kill the auxiliary engine as soon as either or both of the bicycle hand brakes are touched for braking. Additionally, a dead man switch arrangement may be provided, associated with the bicycle operator, for example, which serves to turn off the engine anytime the rider becomes separated from the bicycle.

As for the clutch assembly for engaging the engine drive wheel with the bicycle rear tire, it has been found that a conventional, pivoted or rachet derailleur control system may be employed to move the engine drive wheel into engagement with the bicycle rear wheel in a controlled manner, against the urging of a compression spring arranged to force the drive wheel off of the bicycle rear tire.

Accordingly, it is a principal object of the invention to provide an auxiliary, gas powered engine assembly for use on a bicycle, having a mounting carriage in which the engine drive wheel is spring urged away from the driven tire, and employing a Bowden cable assembly or the like for forcing the drive wheel into engagement with the driven wheel, against the urging of the spring.

It is another object of the invention to provide an auxiliary gas powered engine assembly which can be installed quickly and easily on a conventional bicycle.

It is a further object of the invention to provide an auxiliary gas powered engine assembly for propelling a conventional bicycle which may be installed without modifying the bicycle in any manner.

It is an object of the invention to provide an auxiliary engine assembly for a bicycle or the like having the engine drive wheel assembled in a fail safe configuration, there further being engine momentary kill switch mechanisms associated with the bicycle conventional hand brakes for disabling the engine when braking is initiated.

It is a further object of the invention to provide an auxiliary engine assembly for a bicycle or the like including a drive wheel having a somewhat self adjusting interfit with the engine output shaft, thus to accommodate irregularities in the driven wheel and/or tire and yet provide a firm, non-slip interengagement of drive wheel to driven wheel.

It is another object of the invention to provide an auxiliary gas powered engine assembly for propelling a bicycle including brake operated, momentary kill switches which disable the engine's power as soon as either or both brakes are actuated, but permits the engine to reignite by a compression start as soon as both brakes are released. So long as the engine drive wheel and the bicycle driven, or rear, wheel are engaged, the engine may be repeatedly stopped and started while the bicycle is moving, simply by compressing and releasing the brake controls of the bicycle.

It is a further object of the invention to provide a bicycle having an auxiliary gas powered engine assembly which is portable and very easily installed on and removable from a bicycle without need of any special parts or tools.

It is yet another object of the invention to provide a bicycle having an auxiliary gas powered engine and mounting assembly which is constructed with inexpensive parts.

Still another object of the invention is to provide a bicycle having a gas powered engine assembly that is completely safe and reliable in operation, there being fail safe mounting and braking components integral with the assembly.

It is an object of the invention to provide a bicycle with an auxiliary gas powered engine and mounting assembly having uncomplicated adjusting mechanisms allowing for universal assembly of the engine onto most any type, style and size of bicycle, tricycle or the like.

Yet a further object of the invention is to provide an auxiliary gas powered engine and carriage assembly which may be employed as a power take off subassembly, and including inherent, integral fail safe mechanisms.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 5 is a view similar to FIG. 4, but showing the engine drive wheel engaged with the bicycle rear wheel;

DETAILED DESCRIPTION OF THE PREFERRED EMBODIMENTS

Before explaining in detail the present invention, it is to be understood that the invention is not limited in its application to the details of construction and arrangement of parts illustrated in the accompanying drawings, since the invention is capable of other embodiments and of being practiced or carried out in various ways. By way of example only, it should be understood that the present invention, while specifically disclosed as being used with a conventional bicycle, could also be used with any one of a wide variety of other wheeled vehicles, ranging from tricycles to wheelchairs. Also it is to be understood that the phraseology and terminology employed herein is for the purpose of description and not limitation.

Figure 1:
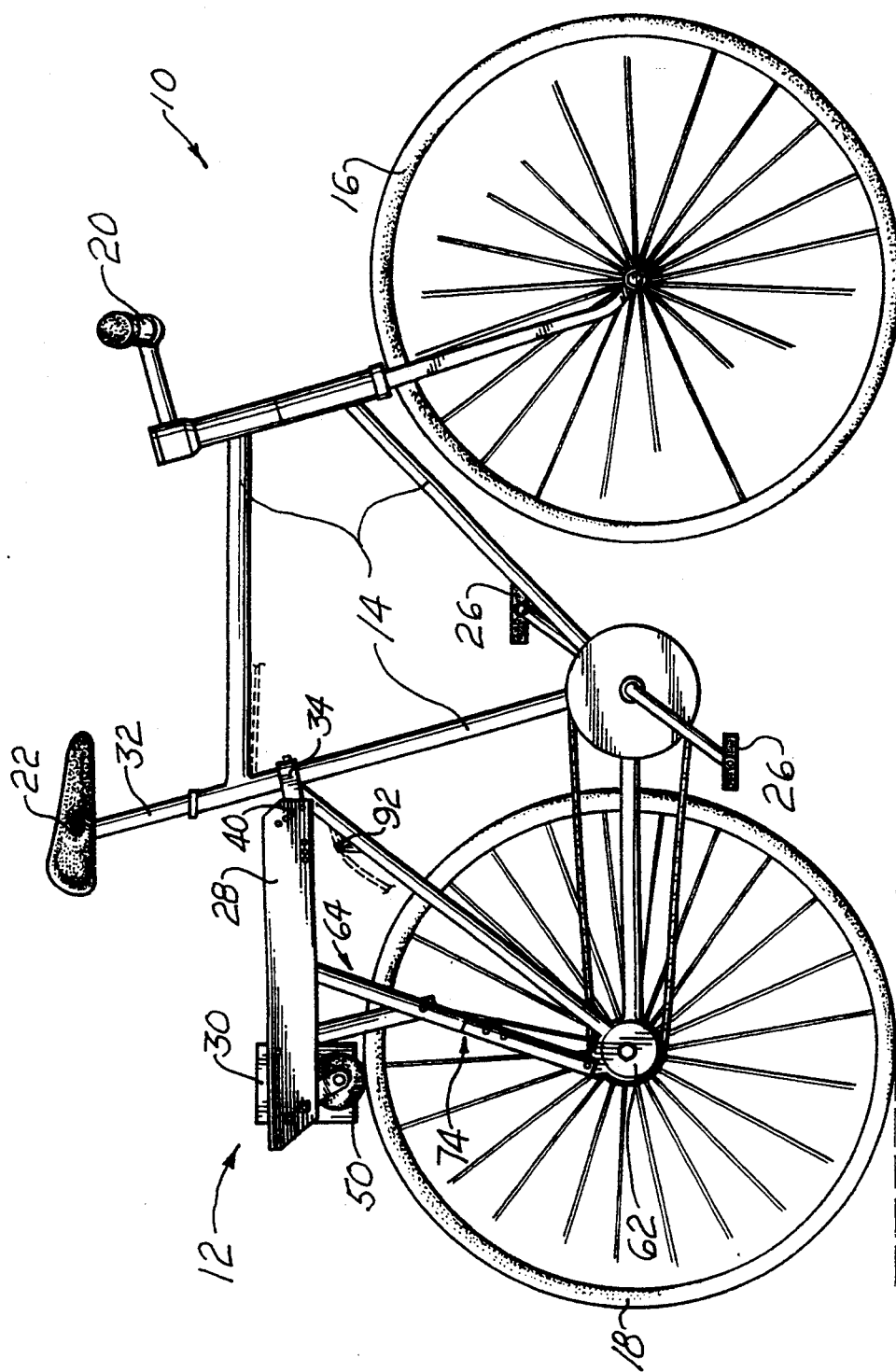
FIG. 1 is an elevational, somewhat diagrammatic, side view of a bicycle having a gas-powered engine assembly mounted on the rear bicycle frame in accordance with the preferred embodiment of the present invention.

FIG. 1 shows a conventional bicycle 10 equipped with a gas powered engine assembly 12 according to an embodiment of the present invention. The bicycle 10 includes a frame 14, a front wheel 16, a rear driving wheel 18, handlebars 20, a seat 22, a control handle cable assembly 24 (see FIGS. 4 and 5), and pedals 26. The bicycle 10 may be of the usual lightweight, multi-speed type, or a dirt bike, BMX bike, or any one of the wide variety of bicycles currently marketed and used, and is entirely of conventional construction, apart from the gas powered engine assembly 12 discussed herein.

As illustrated in FIG. 1, the gas powered assembly 12 of the bicycle 10 includes an inverted, U-shaped carriage or rack 28, preferably an aluminum extrusion, and a gas powered, small, lightweight engine 30. Aluminum is the preferred material making up the carriage 28, because the material is lightweight and acts as an excellent heat sink for engine cooling. The engine 30 may be a readily available, very small and lightweight, 2 cycle engine; a 49 cc displacement engine is quite suitable, both from weight and cost considerations. The construction and arrangement of the carriage 28 provides sufficient space for auxiliary components, such as fuel cells, luggage, lights, spare parts, etc. (not shown).

Figure 2:
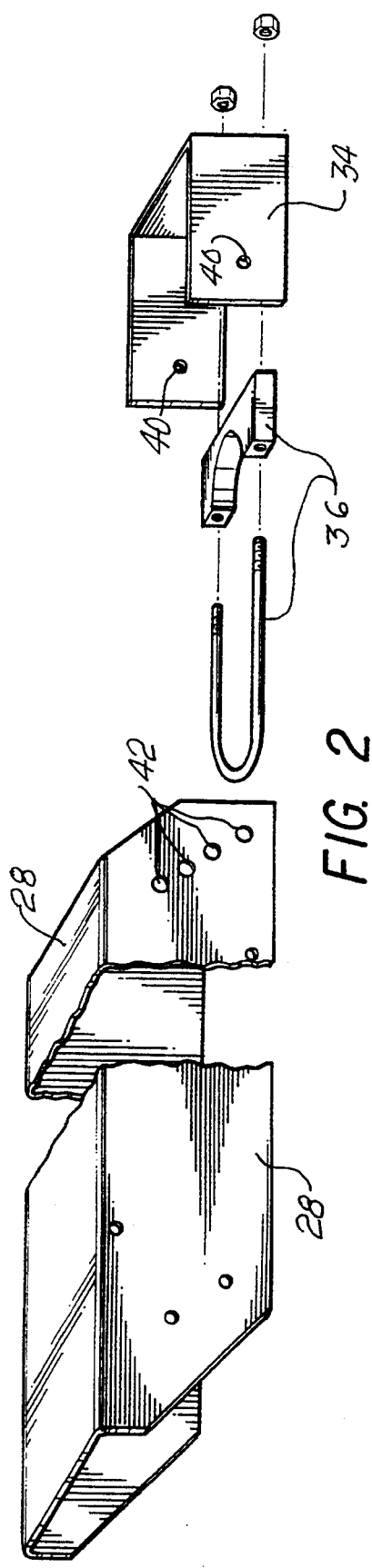
FIG. 2 is an enlarged scale, fragmentary, partially exploded perspective view of the essential engine mounting components.

With further reference to FIGS. 1 and 2, carriage 28 is secured to seat post 32 of bicycle frame 14 by a U-shaped mounting clamp 34 secured to the seat post 32 by a U-bolt and bracket assembly 36 and a pair of nuts 38, 38 (these may be lock nuts, if desired) threaded onto the ends of the U-bolt, as indicated by the exploded view, FIG. 2. In turn, the forward end of carriage 28 is pivotally mounted on or attached to clamp 34 by a nut and bolt assembly (not shown) inserted through holes 40, 40 of clamp 34, and a selected pair of opposed holes 42 formed through the forward end of carriage 28. Four sets of holes 42, for example, may be provided, one series of the set of four being shown in FIG. 2. A number of such mounting holes are provided so that the invention may fit a wide variety of bicycles. The attachment of carriage 28 to seat post 32 is clearly seen in FIG. 1.

Figure 7:
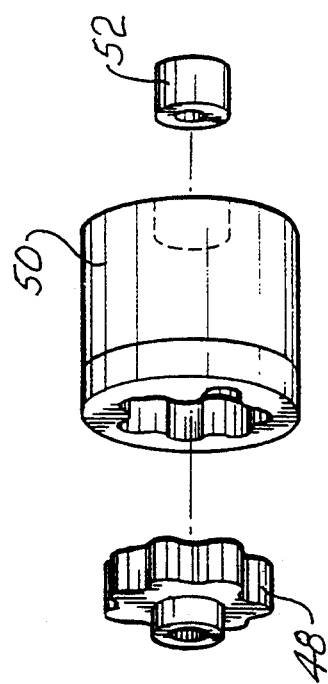
FIG. 7 is an exploded, perspective view showing a drive cog, drive wheel and weight carriage bearing.
Figure 6:
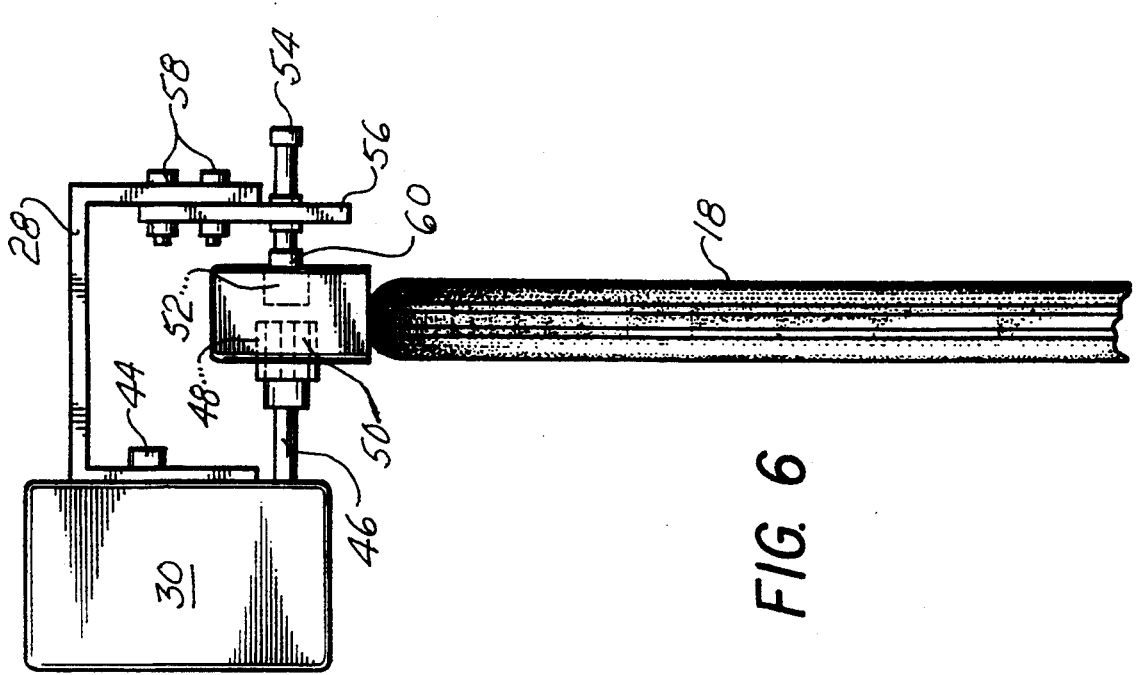
FIG. 6 is a rear, elevational view showing the mounting of the engine and carriage assembly of the rear drive wheel of the bicycle.

Turning now to FIGS. 1, 6 and 7, it is seen that the small, 2 cycle, 49 cc (for example) engine is mounted on the rear of carriage 28 as by one or more nut and bolt assemblies 44. Engine 30 includes an output shaft 46, having a multitoothed cog wheel 48 at the outer end thereof, which is interfit within a polyurethane drive wheel 50. Conveniently, drive wheel 50 is hollowed out to comfortably receive the cog wheel 48. On the opposite side, wheel 50 is bored to receive a weight carriage bearing 52 and the assembly is held in place by an adjustable nut and bolt assembly 54. In turn, the assembly 54 is mounted through a bracket 56, which is securely bolted to carriage 28 as is shown at 58. Adjustability of the just described assembly is provided by a lock nut 60, which may be adjusted inwardly or outwardly as needed to allow drive wheel 50 a bit of play so as to accommodate any irregularities in the bicycle rear tire and wheel 18. With such flexibility, it has been found that the tire 18 and polyurethane wheel 50 combine to provide a shock absorbing motor mount. Heat transfer and/or abrasive wear patterns and/or unproductive friction are minimized and even eliminated, yet drive wheel 50 is maintained in firm engagement with rear wheel 18, even when the bicycle is ridden over rough, washboard type terrain. Thus, the present invention is completely unlike prior art devices, where the drive wheel often becomes readily and annoyingly separated from the bicycle driven wheel when an auxiliary engine is employed.

Figure 4:
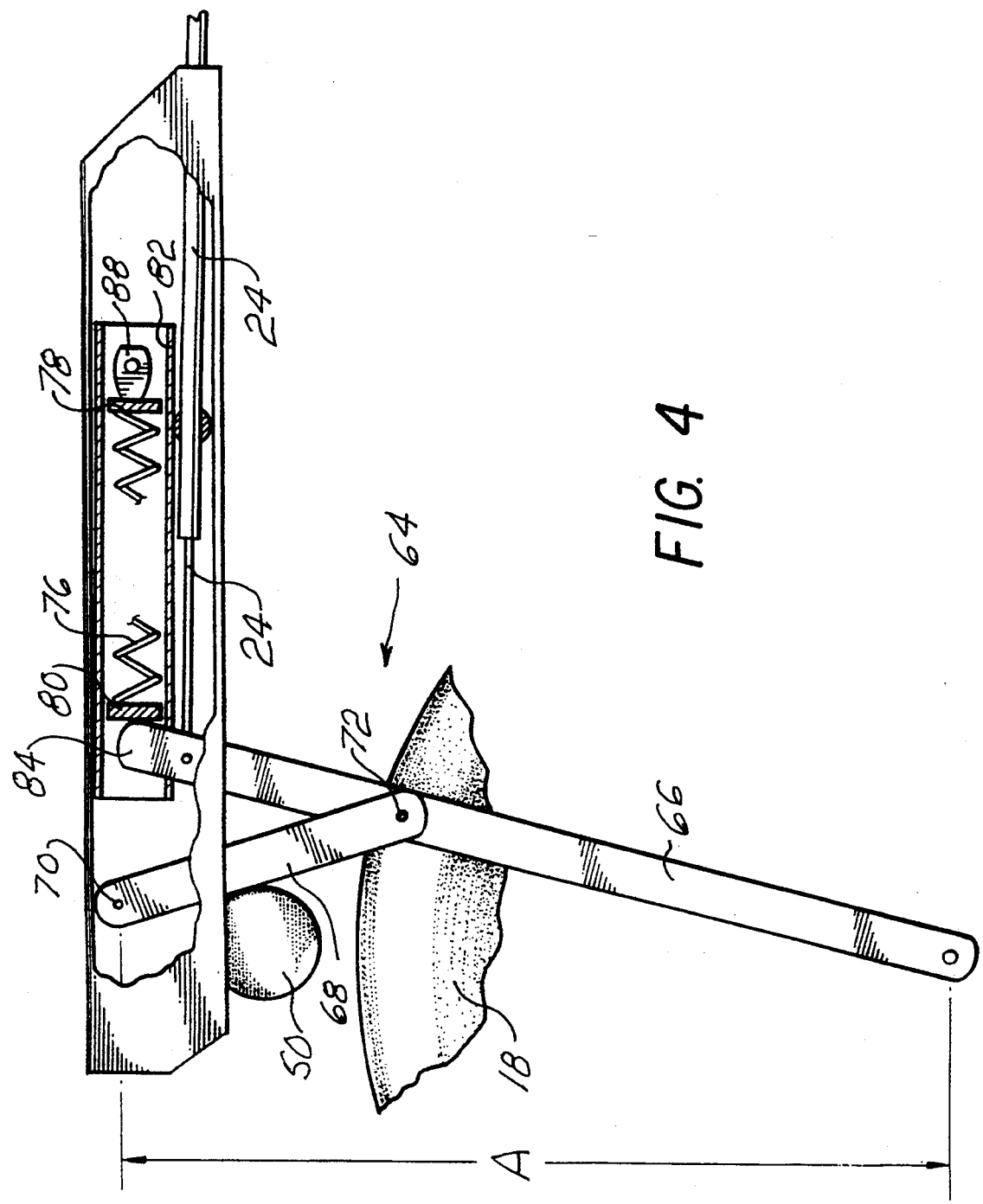
FIG. 4 is an enlarged scale, partially fragmentary elevational side view showing the arrangement of parts with the engine drive wheel disengaged from the bicycle rear wheel.

The operation and engagement of drive wheel 50 with rear wheel 18 of the bicycle 10 will become readily apparent from the following discussion and reference to FIGS. 1, 4 and 5. In FIG. 4, drive wheel is seen disengaged from rear wheel 18 of the bicycle, and in FIG. 5, the drive wheel 50 is engaged with the bicycle rear wheel 18. The carriage 28 is supported from a rear axle bracket 62 by a somewhat Y shaped strut assembly 64; conveniently, the lower end of the Y strut may be mounted to an axle bracket hole normally provided for mounting a child's seat behind the bicycle rider. Alternatively, a small bracket secured to the bicycle frame could be employed to mount the lower end of Y strut 64 (not shown). Y strut 64 includes a major arm 66 and a short pivot arm 68, which is pivotally mounted to both the carriage 28 and the major arm 66, as is indicated at 70, 72, respectively. Major arm 66 is universal, as it may be adjusted in length, by being constructed in two sections, for example Major Arm 66, adjusted and then is bolted together as is generally indicated in FIG. 1, at 74.

Mounted within carriage 28 is an axial compression device comprising a compression spring 76 with front and rear seats 78 and 80, respectively, all contained within a tube 82, conveniently fabricated from a length of PVC pipe. Alternatively, compression spring 76 could be an otherwise conventional gas strut. The upper end 84 of major arm 66 is urged against seat 80 by the control handle cable assembly 24, an otherwise conventional derailleur assembly, in a preferred embodiment. The handlebar clutch control of derailleur 24 is shown at 86, in FIG. 8. The conventional adjusting tension mount for cable 24 is seen at 88, FIGS. 4 and 5, and the tension mount may be mounted in any one of three holes 90, provided along carriage 28, as may be required for proper operation of derailleur 24, which is used to raise and lower carriage 28 so that drive wheel 50 is out of engagement with rear wheel 18 of bicycle 10 (FIG. 4) or in driving engagement with rear wheel 18 (FIG. 5). The clutching of derailleur 24 causes end 84 of arm 66 to move to the right, in the sense of FIGS. 4 and 5, thus pivoting arm 66 counterclockwise, and reducing the effective length distance of the carriage 28 with respect to the bicycle axle of the rear wheel, from the distance A, seen in FIG. 4, to the distance B, as seen in FIG. 5. Furthermore, the compression strength of spring 76 may be adjusted by a cam 88 having opposed flats. Rotation of the cam 88, 180 degrees from the position shown in FIGS. 4 and 5 will reduce the compression strength of the spring 76 somewhat. Adjustment of the compression strength of spring 76 also may be desirable when drive wheel 50 is replaced with a different diameter wheel, as will be explained below.

As can be appreciated from FIG. 1, the entire carriage may be raised about its forward pivot at 40 (FIG. 2) by simply disconnecting the lower end of major arm 66 from the bicycle rear axle and raising the arm 66. Conveniently, the arm may be propped upon the rear tire 18, so as to access parts beneath carriage 28. This is desirable when one wishes to change the drive wheel to a different size, for example. Since the drive wheel 50 is only held in place by compression between the cog 48 and bearing 52, unthreading of bolt 54 allows an easy change of a drive wheel 50. Drive wheel 50 may be sized from one and one-half inches, for high torque capability, up to three inches in diameter or more, for higher cruising speed, allowing for a variety of applications.

Figure 3:
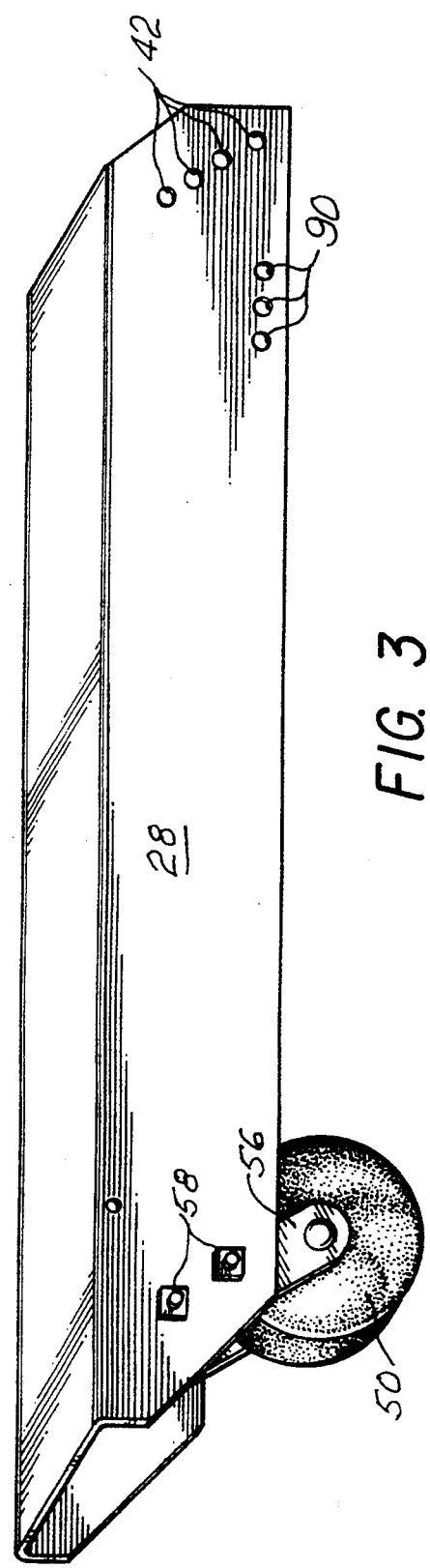
FIG. 3 is an enlarged scale, diagrammatic, perspective view of an aluminum extrusion carriage for mounting the engine.

An inspection and comparison of FIGS. 3 and 6 reveals that removal and replacement of the drive wheel 50 is accomplished very easily. With the engine and drive wheel in the disengaged configuration shown in FIG. 4, the nut and bolt assemblies indicated at 58 may be removed. As can be appreciated from FIG. 6, sufficient clearance is provided such that drive wheel bracket 56 is moved to clear the depending skirt portion of carriage 28, whereupon the entire assembly is removed from drive cog wheel 48; the parts 48 and 50 are merely slidably interfitted together, as was explained above. One may then very easily inspect parts for wear or damage, replace the carriage bearing 52 if needed, change the drive wheel 50 if worn or if another sized wheel is desired, for reasons explained above, or perform any needed adjustments. Replacement of the subassembly including wheel 50, bearing 52, assembly 54 and bracket 56, is also very easily done, simply by fitting drive wheel 50 over cog 48, aligning bracket 56, and reattaching the nut and bolt assemblies 58.

Figure 8:
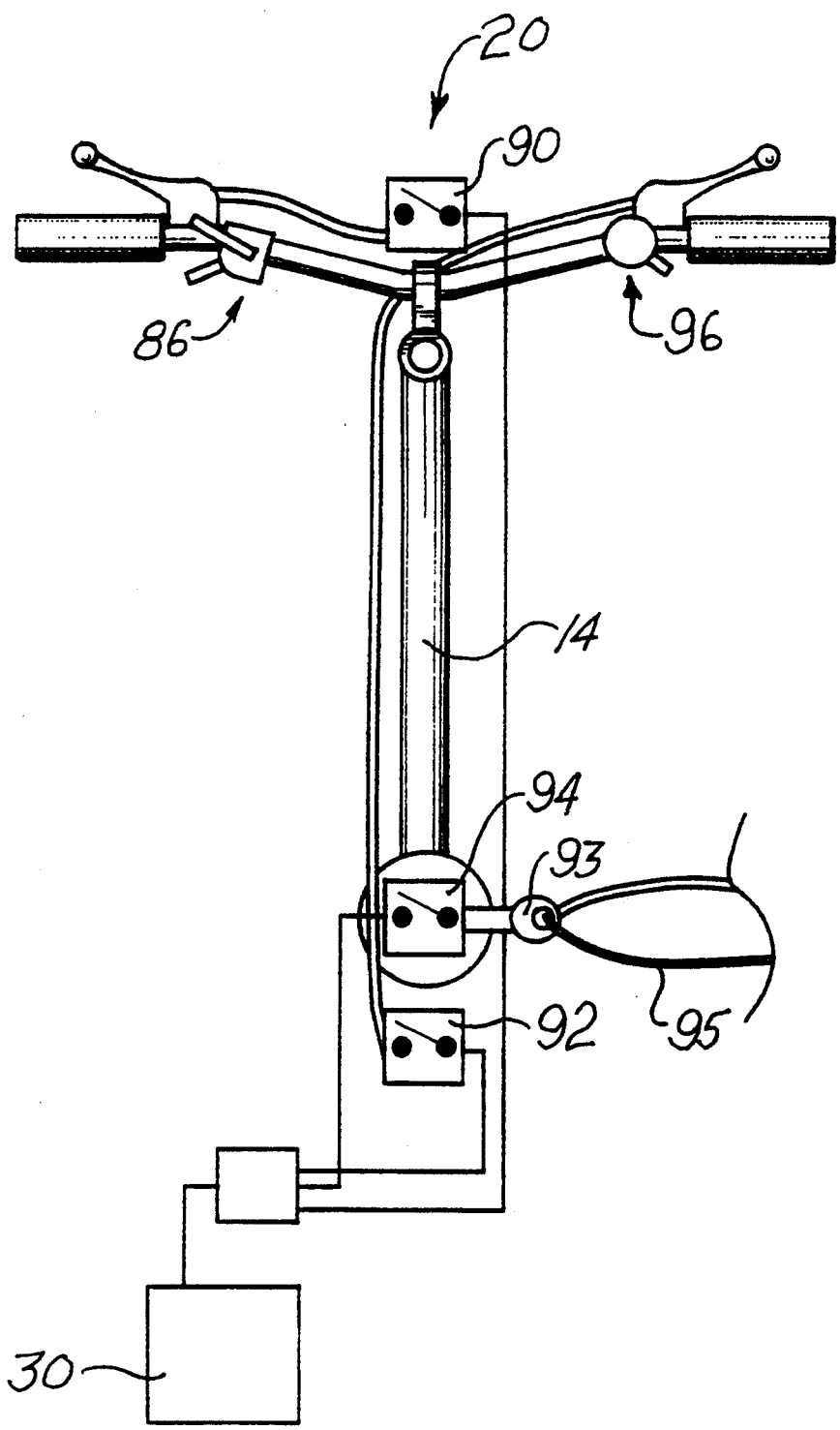
FIG. 8 is a mechanical and electric wiring diagram showing areas for hand controlled and safety/convenience devices for the invention.

Referring now to FIG. 8, additional safety features of the invention will be discussed. By now, it can be readily appreciated that any failure in derailleur 24 would only cause the engine and carriage to raise upwardly to a non-driving wheel engaged attitude, or a fail safe position, unlike prior art assemblies. The invention is extremely lightweight, incidentally; in a preferred embodiment, a 49 cc engine with carriage 28 and all associated hardware weighs only about eleven and one-half pounds. The engine weighs six and one-half pounds and all the other components combined weigh but five pounds. Also, since the invention is connected to the bicycle at just two points, rear axle bracket and seat post, it may be readily attached and removed from the bicycle 10 in short order. In FIG. 8, momentary kill switches are indicated, one at 90 for the front brake, and one at 92 for the rear brake. These switches are wired to ground the ignition of the engine to the bicycle frame immediately upon an associated brake lever being depressed or just touched. Conversely, when both brakes are released and assuming the bicycle is underway, the engine 30 will be restarted by a compression start, due to the action of bicycle wheel against the engine drive wheel 50. This invention thus provides for virtually instantaneous engine on-off-on operation, with minimal effort on the part of the operator.

As an option for even further safety, a key switch 94, operable by a key 93, could be provided, beneath seat 22 as is indicated in FIG. 8, for example. Key 93 is connected by a belt loop, partially indicated at 95, to the operator. Thus, should the rider fall off of the bicycle 10 or even try to stand on the pedals 26, the key 93 readily separates from switch 94, permitting switch 94 to close and thus disable the engine 30.

Finally, an engine throttle control 96 is shown. This is conveniently mounted on the right handlebar, near the grip, as is indicated in FIG. 8.

It has been determined after extensive experimentation that the engine drive wheel 34 should preferably be fabricated of a polyurethane material. However, it is to be understood that different material types and sizes of friction wheels may be used in practicing the instant invention.

The assembly 12 operates in various modes, such as at an idle speed while the bicycle 10 is traveling on a level surface, or at a higher throttle setting as when climbing a hill. It is to be understood that the starting of the engine 30 is a compression start situation where the engine 30 is started by the forward movement of the bicycle 10 on a level or downhill situation. When the operator desires to terminate a power assisted operation, the brakes are actuated, which effectively kills the engine 30 to terminate its power assisted operation. This termination of power also produces compression braking. The clutch may then be disengaged and the entire carriage assembly will have no interaction with normal pedal operation of the bicycle.

It is to be understood that the present invention is not limited to the embodiments described above, but encompasses any and all embodiments within the scope of the following claims. For example, the instant invention discloses a single strut assembly 64 associated with the rear wheel 18, but it is obvious that an additional strut member could be added on the opposite side of strut 64 to reinforce the support of the assembly 12 on the bicycle 10.

What is claimed is:

1. A gas powered engine assembly for use on a wheeled vehicle having a frame and a tire equipped driving wheel, the engine assembly being mounted above the tire equipped wheel and comprising:
an internal combustion engine;
a strut member and an elongated carriage member for supporting said engine for propelling the wheeled vehicle;
an axial member comprising a compression device pivotally mounted within said carriage member;
said strut member being pivotally mounted at one end thereof to said axial member pivotally mounted on said carriage member;
said elongated carriage member having means for pivotally mounting one end thereof to the frame of the wheeled vehicle;
said elongated carriage member being positioned in a substantially horizontal plane that is parallel to said axial member during the operation of the multi-wheeled vehicle;
a drive wheel mounted in a straddling relationship to the tire equipped driving wheel;
means for operatively connecting said drive wheel with said engine for providing forward rotation to the tire equipped driving wheel;
said compression device mounted within said carriage member for urging said engine and carriage member away from the tire equipped driving wheel; and
cable actuated means for lowering said engine, carriage member and drive wheel against the tire equipped driving wheel, against the urging of said compression device;
whereby the pivotal activation of said strut member together with said cable means cooperatively provide a vertical raising and lowering of said elongated carriage member, engine and engine drive wheel by an operator of the wheeled vehicle.

2. The assembly according to claim 1 wherein said elongated carriage member has an inverted U-shaped configuration.

3. The assembly according to claim 1 wherein said strut member includes upper and a lower slidably interconnected together, and means mounted within the upper and lower sections for maintaining said strut member in an adjusted, fixed position while directing a first arm to accordingly and automatically adjust total strut assembly height as interconnected fixed position strut members move axially.

4. The assembly according to claim 1 wherein said carriage member is fabricated as an aluminum extrusion.

5. The assembly according to claim 1, further comprising kill switch means selectively operated by the operator of the wheeled vehicle, to disable said engine momentarily.

6. The assembly according to claim 1, comprising key operated kill switch means, where upon separation of the operator from said key operated switch means, said engine is disabled.

7. The assembly according to claim 1 wherein said drive wheel is made of a polyurethane material.

8. The assembly according to claim 1, further comprising, in combination, a multi-wheeled cycle.

9. A gas powered engine and carriage assembly for use with a wheeled vehicle having a frame and a tire equipped driving wheel, the engine assembly being mounted above the tire equipped wheel and comprising:
an internal combustion engine;
a strut member and an elongated carriage member for supporting said engine for propelling the wheeled vehicle;
an axial member comprising a compression device pivotally mounted within said carriage member;
said strut member being pivotally mounted at one end thereof to said axial member pivotally mounted on said carriage member
said elongated carriage member having means for pivotally mounting one end thereof to the frame of the wheeled vehicle;
said elongated carriage member being positioned in a substantially horizontal plane that is parallel to said axial member during the operation of the multi-wheeled vehicle;
a drive wheel on said engine mounted in a straddling relationship to the tire equipped driving wheel;
said compression device mounted within said carriage means for urging said engine and carriage member away from the tire equipped driving wheel; and,
cable actuated means for lowering said engine, carriage member and drive wheel against the tire equipped driving wheel, against the urging of said compression device;
whereby the pivotal activation of said strut members, together with said cable means cooperatively provide a vertical raising and lowering of said elongated carriage member, engine and engine drive wheel by an operator of the wheeled vehicle;
means to operatively connect said drive wheel to said engine by means of an axially mounted multitooth cog member which is operatively embedded within said drive wheel member, thus providing a degree of flexibility along x, y, and z axes of said drive wheel member.

10. The assembly according to claim 9, wherein said compression device comprises a helical compression spring, there further being an elongate tube within said carriage member for housing said compression therewithin.

11. The assembly according to claim 9, further comprising means for selectively adjusting the compression strength of said compression device.

12. A gas powered engine and carnage assembly for use with a wheeled vehicle having a frame and a tire equipped driving wheel, the engine assembly being mounted above the tire equipped wheel and comprising:
an internal combustion engine;
a strut member and an elongated carriage member for supporting said engine for propelling the wheeled vehicle;
an axial member comprising a compression device pivotally mounted within said carriage member;
said strut member being pivotally mounted at one end thereof to said axial member pivotally mounted on said carriage member
said elongated carnage member being positioned in a substantially horizontal plane that is parallel to said axial member during the operation of the multi-wheeled vehicle;
a drive wheel on said engine mounted in a straddling relationship to the tire equipped driving wheel;
means to operatively connect said drive wheel to said engine by means of an axially mounted multitooth cog member which is operatively embedded within said drive wheel member, thus providing a degree of flexibility along x, y, and z axes of said drive wheel member;

means for pivotally mounting said carriage member and engine to the frame such that said drive wheel is adjacent the vehicle driven wheel, and movable to a first position, with said drive wheel drivingly engaging the vehicle driven wheel, and to a second position, with said drive wheel disengaged from the vehicle drive wheel;

compression device for urging said engine and carriage member to said second position; and, cable means forcing said carriage member to said first position;

whereby the pivotal activation of said strut members, together with said cable means cooperatively provide a vertical raising and lowering of said elongated carriage member, engine and engine drive wheel by an operator of the wheeled vehicle;

13. The assembly according to claim 12, wherein said carriage is fabricated as an aluminum extrusion.

14. The assembly according to claim 12, wherein said drive wheel is fabricated of polyurethane.

15. The assembly according to claim 12, further comprising, in combination, a bicycle.

16. The assembly according to claim 12, wherein said compression device comprises a compression spring or gas cartridge.

17. The assembly according to claim 12, further comprising kill switch means selectively operated by the operator of the wheeled vehicle, to disable said engine momentarily.

18. The assembly according to claim 17, further comprising an additional, key operated kill switch means, whereupon separation of the key of said key operated kill switch means therefrom, said engine is disabled.

* * * * *